No. 880,967. PATENTED MAR. 3, 1908.
P. BROADBOOKS.
SHEARS.
APPLICATION FILED JUNE 8, 1907.
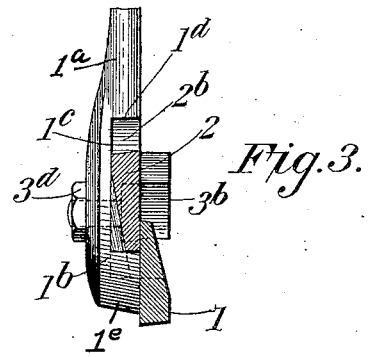
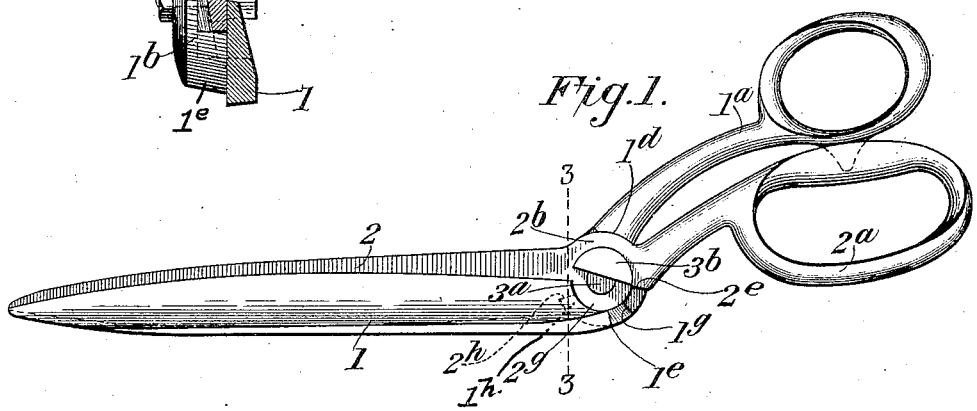
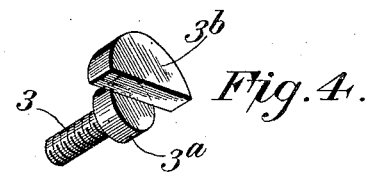
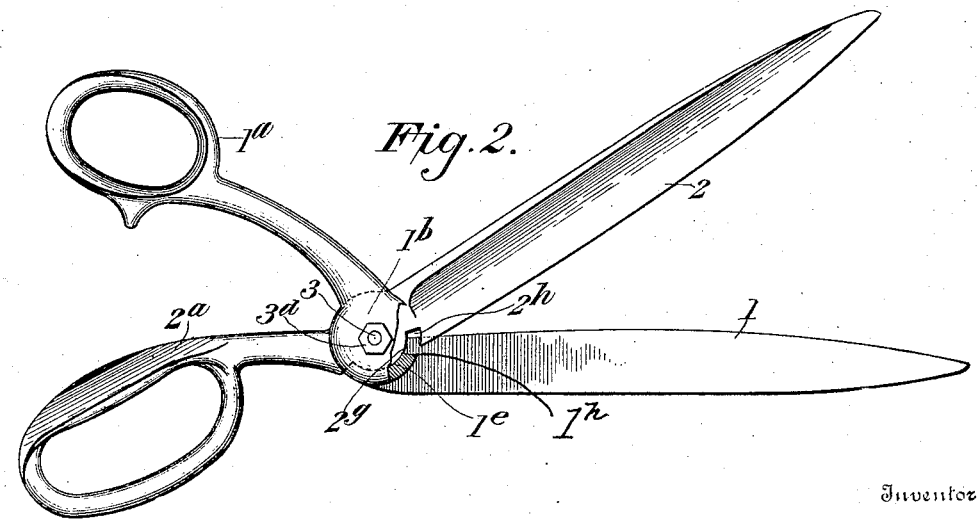
Inventor
Peter Broadbooks.
Witnesses
By Alexander Bowell
Attorneys
THE NORRIS PETERS CO., WASHINGTON, D. C.

UNITED STATES PATENT OFFICE.

PETER BROADBOOKS, OF BATAVIA, NEW YORK.

SHEARS.

No. 880,967.  Specification of Lettes Patent.  Patented March 3, 1908.

Application filed June 8, 1907. Serial No. 377,880.

*To all whom it may concern:*

Be it known that I, PETER BROADBOOKS, of Batavia, in the State of New York, have invented certain new and useful Improvements in Shears; and I hereby declare that the following is a full, clear, and exact description thereof, reference being had to the accompanying drawings, which form part of this specification.

The present invention relates to certain new and useful improvements in the construction of shears and aims to provide a simple and inexpensive article of this character which is peculiarly designed whereby the blades have an interlocking connection with each other and are effectively locked against spreading when in use.

A further object of the invention is to provide shears of this type in which the handles are extended upwardly from the blades, thereby enabling the implement to be readily used without the inconvenience commonly occasioned by the severed edges of the material being operated upon coming into contact with the hand.

For a full understanding of the invention and the merits thereof and also to acquire a knowledge of the details of construction, reference is to be had to the following description and the accompanying drawings, in which:

Figure 1 is a front elevation of a pair of shears embodying the invention, the blades being shown in closed position. Fig. 2 is a similar view taken from the opposite side, the blades being shown in an open position. Fig. 3 is a sectional view on the line 3—3 of Fig. 1. Fig. 4 is a detail perspective view of the pivot pin.

Corresponding and like parts are referred to in the following description and indicated in all the views of the drawing by the same reference characters.

The shears embodying the present invention comprise essentially two complemental members pivotally connected at an intermediate point, each of the said complemental members comprising a handle portion and a cutting blade.

Referring to the drawing it will be observed that the lower blade 1 is integral with the upper handle or lever $1^a$, the latter member being formed with the usual thumb receiving loop; while the upper blade 2 is integral with the lower handle $2^a$ which is also formed with the customary finger receiving loop. The handle $1^a$ is provided upon one side and at a point adjacent to its junction with the blade 1 with a recess $1^c$ designed to receive an approximately circular pivotal portion $2^b$ formed at the junction of the handle $2^a$ and blade 2. A shoulder $1^d$ fitting loosely against the curved upper edge of portion $2^b$ is located at the upper portion of the recess $1^c$, and the base of the said recess is constituted by a flattened portion or plate $1^b$ having the lower edge portion thereof connected to the blade 1 by means of an offset $1^e$. One end of the offset $1^e$ terminates in a shoulder $1^h$ spaced from the rear portion of the cutting edge of the blade 1 and is adapted to engage with a notch $2^h$ in the pivotal portion $2^b$ of the blade 2 while the opposite end $1^g$ of offset $1^e$ constitutes a stop which coöperates with a shoulder $2^e$ upon the handle $2^a$ to limit the pivotal movement of the complemental members.

The pivot pin connecting the complemental members is in the nature of a bolt 3 capped by a nut $3^d$ and formed with a head $3^a$ countersunk in a corresponding recess in the outer face of the disk $2^b$. It will be observed that this pivot bolt is provided upon its head with a projection $3^b$, the lower portion of which is in the nature of a flat surface forming a guide rib by which the severed portion of material is directed downward below the handle $2^a$ and prevented from rising up and interfering with the hand of the operator.

The notch $2^h$ formed in the blade 2 adjacent the pivotal portion $2^b$, and designed to receive the end of the offset $1^e$ performs the double function of enabling the blades to close to their fullest extent and of producing an interlocking connection between the complemental members which prevents their separation except when in an open position.

It will be observed that with this construction the blade 2 of one of the complemental members is received between the blade 1 and handle $1^a$ of the opposite complemental member, and this feature has the advantage of locking the blades against spreading and insuring a strong pivotal connection. The blades 1 and 2 are also enabled to be made of equal width, and by having the handle $1^a$ offset from the blade 1 and the blade 2 inserted between the blade 1 and handle $1^a$, the shears can be closed to much smaller size and can be formed more symmetrical than is possible with the conventional construction of shears.

Having thus described the invention, what is claimed as new is:

1. Shears comprising a pair of pivotally connected complemental members each of which is formed with a blade and handle, the blade of one of the complemental members being offset from its handle and the blade of the opposite complemental member being pivoted between the blade and handle of the first member and provided with a notch designed to receive the forward edge of said offset.

2. Shears comprising a pair of pivotally connected complemental members each of which is formed with a blade and handle, the blade of one of the complemental members being connected to its respective handle by an offset while the blade of the opposite complemental member is provided with a notch designed to engage one end of said offset, the handle of the second mentioned complemental member being formed with a shoulder cooperating with the other end of the offset to limit the pivotal movement of the blades.

3. In a pair of shears, the combination of a pair of complemental members each comprising a blade, and a pin pivotally connecting the complemental members, said pin being formed with a projection for guiding the material being operated upon.

4. In a pair of shears, the combination of a pair of complemental members each comprising a blade and a handle, said handles being extended laterally from the blades, and a pin pivotally connecting the complemental members, said pin being formed with a projection for guiding the severed portion of the material being operated upon away from the handles.

5. A shears comprising a pair of pivotally connected complemental members, one member having its blade offset from its handle, and the other member having a notch near its pivot adapted to receive the forward edge of the offset of the other member, thereby enabling the blades to close to a greater extent and preventing their lateral separation.

6. In shears, the combination of opposite members, one member having its handle and blade offset and connected by a recessed portion, and the other member having a blade and handle connected by a pivotal portion, said pivotal portion fitting in the recessed portion of the offset of the other member, one of the members having a notch engaging a projection on the other member to prevent separation of the members except when the shears is fully opened, and a pivot pin transfixing the pivotal portion and the offset portion of said members.

In testimony that I claim the foregoing as my own, I affix my signature in presence of two witnesses.

PETER BROADBOOKS.

Witnesses:
C. B. PIXLEY,
E. B. PERRY.